United States Patent [19]
Stafford

[11] Patent Number: 5,950,777
[45] Date of Patent: Sep. 14, 1999

[54] ADJUSTABLE, TAMPER-PROOF ENERGY ABSORPTION DEVICE

[75] Inventor: John Kevin Stafford, Franklinville, N.Y.

[73] Assignee: Enidine, Inc., Orchard Park, N.Y.

[21] Appl. No.: 08/961,371

[22] Filed: Oct. 30, 1997

[51] Int. Cl.⁶ .................................. F16F 5/00; F16F 9/00
[52] U.S. Cl. ....................... 188/319.2; 411/910; 411/377
[58] Field of Search .................... 188/265, 300, 188/319.1, 319.2; 403/20, 362; 411/373, 377, 431, 910

[56] References Cited

U.S. PATENT DOCUMENTS

| | | |
|---|---|---|
| 1,677,607 | 7/1928 | Wood . |
| 2,354,160 | 7/1944 | Wallgren . |
| 2,363,665 | 11/1944 | George ..................................... 411/377 |
| 2,780,321 | 2/1957 | Sturari .................................. 188/319.2 |
| 2,917,331 | 12/1959 | Baer et al. . |
| 3,065,662 | 11/1962 | Spoehr et al. ........................... 411/910 |
| 3,664,400 | 5/1972 | Moore . |
| 3,848,710 | 11/1974 | Thompson et al. .................. 188/319.2 |
| 3,977,221 | 8/1976 | Foote . |
| 4,305,486 | 12/1981 | Cowan .................................... 188/319 |
| 4,621,230 | 11/1986 | Crouch et al. . |
| 4,709,791 | 12/1987 | Houghton . |
| 4,711,760 | 12/1987 | Blauschild . |
| 4,732,517 | 3/1988 | Crouch et al. . |
| 5,159,997 | 11/1992 | Heideman et al. ................ 188/222.15 |
| 5,244,323 | 9/1993 | Tucchio . |

*Primary Examiner*—Chris Schwartz
*Attorney, Agent, or Firm*—Wall Marjama Bilinski & Burr

[57] ABSTRACT

An installation kit for installing an absorption device on a piece of equipment and then rendering the device tamper-proof with respect to the damping setting thereof, including an absorption device having an adjustment member for adjusting the damping setting thereof, and locking mechanism for locking the adjustment member after the damping setting has been set to a desired level. The kit also includes an obstruction element to be applied to the locking mechanism for prohibiting access to the locking mechanism. The obstruction element is a mass of deformable material disposed on a sheet material that facilitates alignment of the mass of deformable material with the locking mechanism during transfer of the mass of deformable material into the locking mechanism. The invention also relates to a method of adjusting the damping setting of an absorption device and then rendering the device tamper-proof with respect to the damping setting thereof.

18 Claims, 2 Drawing Sheets

ADJUSTABLE, TAMPER-PROOF ENERGY ABSORPTION DEVICE

BACKGROUND OF THE INVENTION

The present invention relates to an adjustable, tamper-proof energy absorption device that can be used in all types of applications where it is necessary to absorb shock or control motion between two members movable relative to one another. Such devices are typically used to decelerate and control moving loads and mechanisms in equipment such as robotic assembly machines, packaging machinery, and automated storage and retrieval systems.

When an original equipment manufacturer (OEM) installs an absorption device in a particular piece of equipment, it is necessary that the device have damping characteristics that are specifically suited for the particular equipment application. For example, a shock absorber used to decelerate a small, light-weight pallet on a conveyor system would have different damping characteristics than a shock absorber used to decelerate a large, heavy pallet on a larger conveyor system.

Conventional absorption devices are known wherein the damping setting of the device is preset at the factory for a particular application. No adjustment by the OEM is possible. This makes it impossible to mass produce a "generic" absorption device that can be selectively tuned by an OEM for various different equipment applications.

Other conventional absorption devices have been known that enable the OEM to adjust the damping setting of the absorption device during installation, and then lock the damping setting at the desired setting.

Adjustable absorption devices have also been known wherein the OEM can adjust the damping setting of the device to suit the needs of a particular equipment application. U.S. Pat. Nos. 4,709,791 and 5,598,904, owned by the same assignee as the present application, disclose such an absorption device. However, the end user of the equipment can also adjust the damping setting of the absorption device, thus resulting in the possibility that the device later will be misadjusted for a particular application to the point where the absorption characteristics of the absorption device are ineffective for the particular application.

SUMMARY OF THE INVENTION

It is an object of the present invention to provide an installation kit for installing an absorption device on a piece of equipment and then rendering the device tamper-proof with respect to the damping setting thereof. The kit includes an absorption device of the type having adjustment means for adjusting the damping setting thereof, and locking means for locking the adjustment means after the damping setting has been set to a desired level. The kit also includes obstruction means to be applied to the locking means for prohibiting access thereto. Preferably, the obstruction means includes a mass of deformable material, such as a substantially spherical ball made of plastic. The plastic ball is carried on a carrier, such as adhesive tape, and then transferred from the tape to the locking means of the absorption device to prevent access to the locking means.

Another object of the present invention is to provide a method of adjusting the damping setting of an absorption device and then rendering the device tamper-proof with respect to the damping setting thereof. Again, the absorption device is of the type that includes adjustment means for adjusting the damping setting thereof, and locking means for locking the adjustment means after the damping setting has been set to a desired level. The method includes the steps of manipulating the adjustment means to set the damping setting of the absorption device to a desired setting, removably attaching a carrier including a mass of deformable material to the absorption device, such that the mass of deformable material is in substantial alignment with the locking means, and transferring the mass of deformable material from the carrier into compressed engagement with the locking means to thereby prohibit access to the locking means, thereby rendering the damping setting of the absorption device tamper-proof.

Another object of the present invention is to provide a mechanism for rendering the damping setting of an adjustable energy absorption device tamper-proof, the adjustable energy absorption device being of the type that includes a rotatable adjustment member disposed in proximity to a fixed base and locking means for preventing relative rotation of the adjustment member and the fixed base. The mechanism includes a carrier and obstruction means removably adhered to the carrier. The obstruction means has a predetermined dimension that enables it to be compressively retained in a tool-receiving recess formed in an exposed end of the locking means of the energy absorption device.

DETAILED DESCRIPTION OF THE INVENTION

Figure 1:
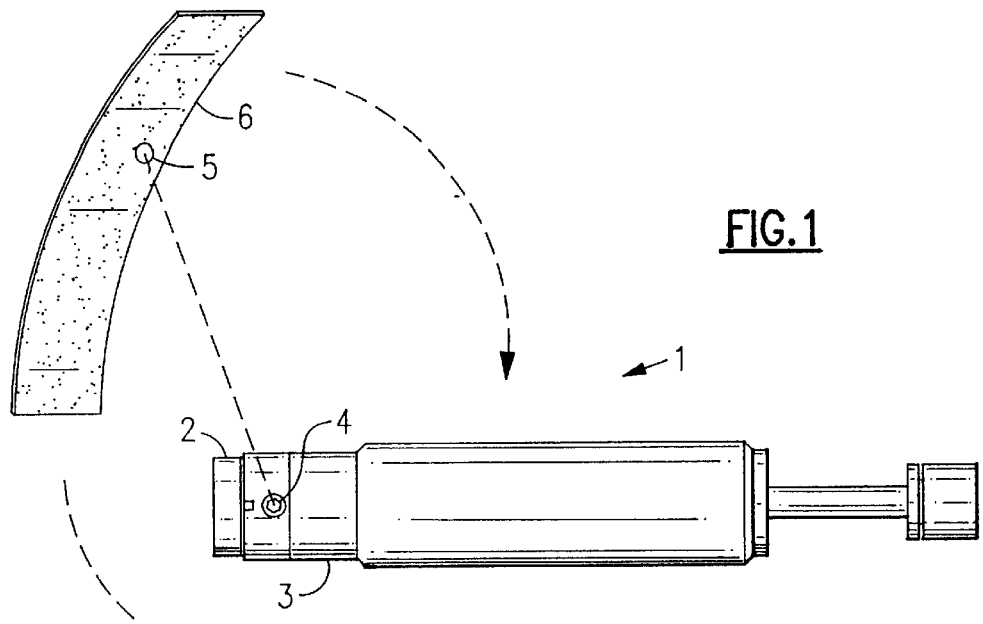
FIG. 1 is a perspective view of the components of the kit useful for a first energy absorption device according to the present invention.
Figure 2:
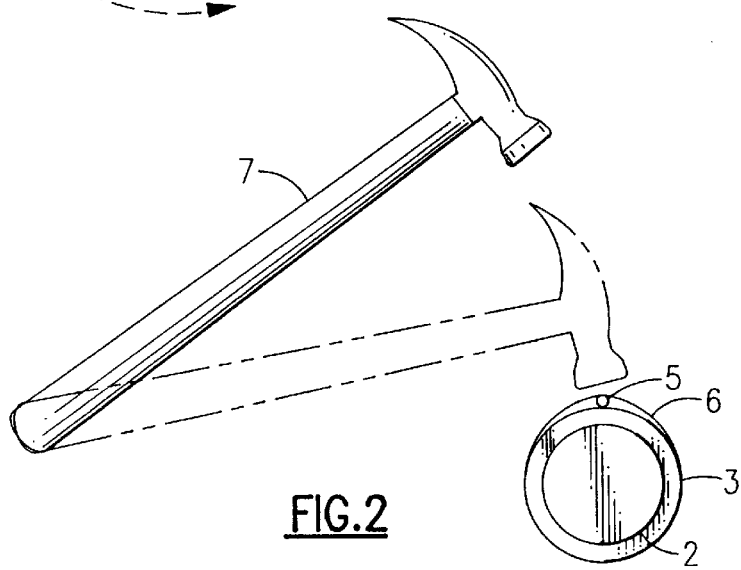
FIG. 2 is an end view of the energy absorption device shown in FIG. 1, with the adhesive tape in place on the device.
Figure 3:
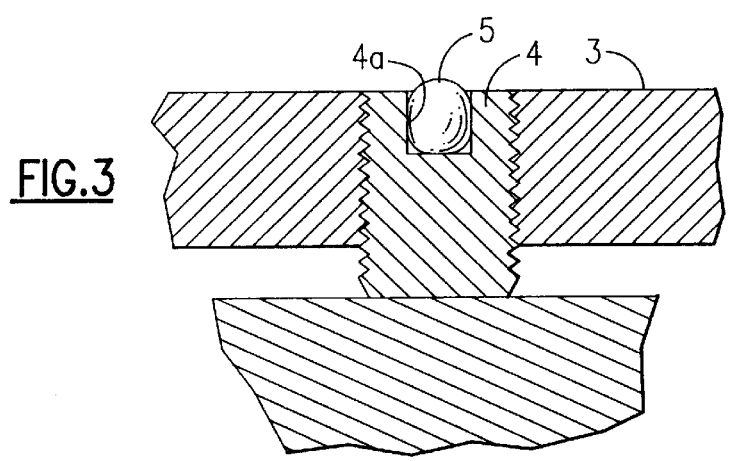
FIG. 3 is a cross-sectional view showing the socket head set screw of the adjusting means of the device with a plastic ball forced in the tool-receiving opening of the set screw.

FIG. 1 shows the components of the kit according to a first embodiment of the present invention. The kit includes an adjustable energy absorption device 1 having inner 2 and outer 3 cylindrical tubes arranged coaxially one inside the other, as is shown in U.S. Pat. No. 5,598,904, the entire disclosure of which is hereby incorporated by reference. The damping setting of the device 1 is adjusted by rotating the inner tube 2 which serves as a collar relative to fixed tube 3, in a known manner. Once the damping setting is adjusted to the desired setting, a socket head set screw 4, that extends through the outer tube 3 into engagement with the outer surface of inner tube 2, is tightened to prevent further relative rotation between the inner and outer tubes. Any type of threaded stud-type fastening means can be used to prevent relative rotation of the inner and outer tubes, provided the fastener has a tool-receiving opening formed in the exposed end thereof.

A plastic ball 5 is driven into the hex hole 4*a* of a socket head set screw 4, to prevent access to the hole, and therefore prevent removal of the screw. The screw 4 would have to be loosened before any further adjustment of the damping setting of the absorption device 1 would be possible. While a drill could, of course, be used to bore out the ball and allow access to the socket head set screw, the plastic ball 5 provides enough of a deterrent to prevent the end user from changing the damping setting of the absorption device.

The plastic ball 5 is carried by a section of adhesive tape 6, to facilitate handling and alignment of the ball with the hex hole 4a in the socket head set screw 4. Specifically, adhesive tape 6 is attached to the outer periphery of the outer tube 3 in such a manner that the plastic ball 5 is positioned immediately above hole 4a in the socket head set screw 4. Once so positioned, the ball 5 is hit with an impact instrument, such as a hammer 7, to force transfer of the ball from the tape 6 into the socket head set screw 4. The tape 6 is then removed.

The plastic ball 5 is deformable and dimensioned such that it is compressively engaged within the hex hole 4a. Preferably, the ball is dimensioned to be larger in diameter than that of hexagonal opening 4a in the socket head set screw. The difference between the diameter of the ball and the width of the opening of the hex hole 4a should be selected to allow a tight compressive fit, but not so large as to cause portions of the ball to be sheared from the main body of the ball when forced into the hole.

Figure 4:
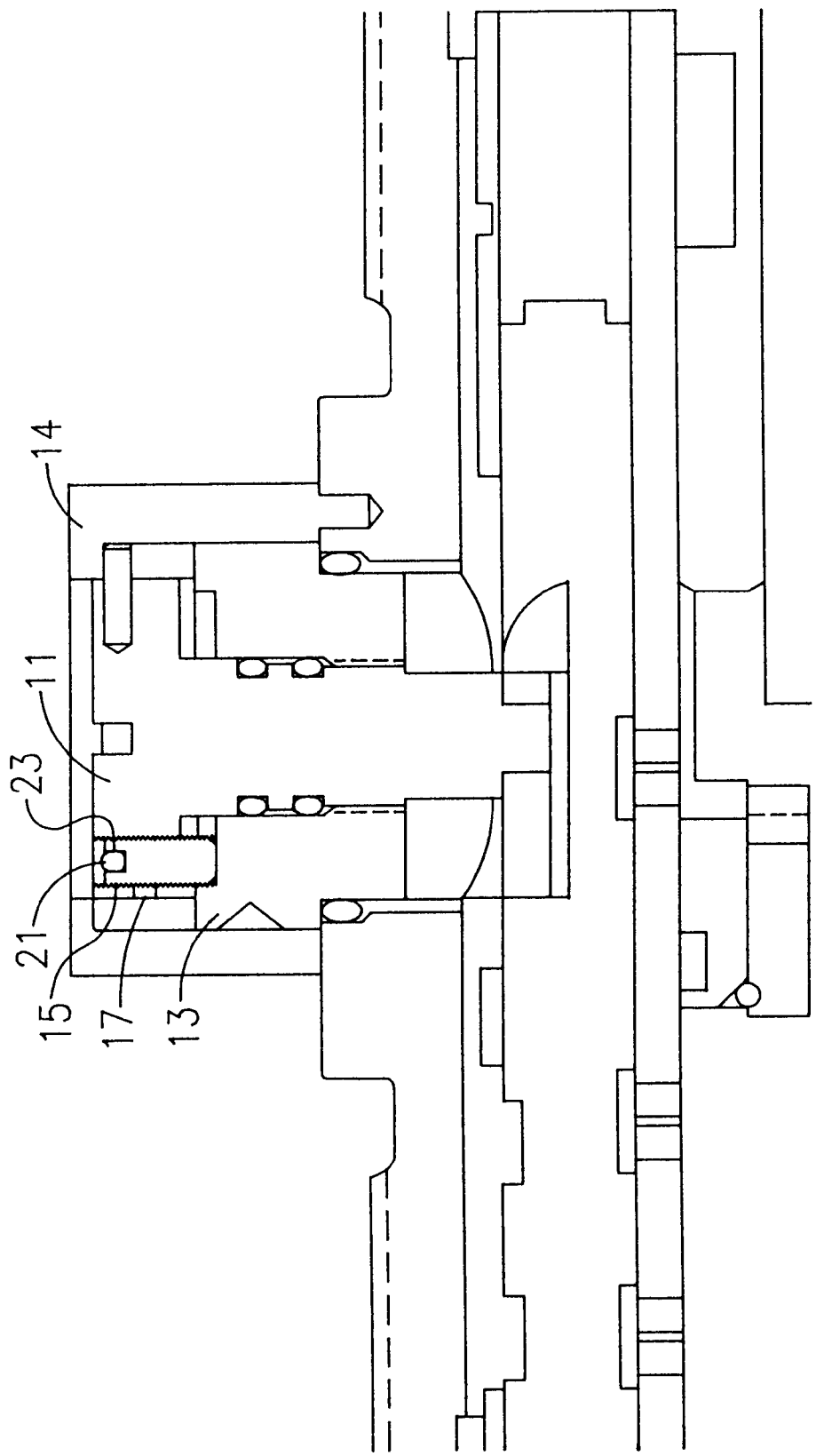
FIG. 4 is a sectional partial view of a second energy absorption device with which the present invention can be used.

Other configurations can utilize a similar benefit. For example, and referring to FIG. 4, a rotatable damping adjustment knob 11 useful on any suitable assembly (not shown) can be locked in place relative to a fixed base 13 using a socket head set screw 15 which is attached through an opening 17. A deformable spherical ball 21 can then be placed in a tool-receiving opening of the screw head 23 and compressed as described above to prevent tampering after a desired setting has been selected, for example by the OEM prior to shipment of the assembly 14, partially shown.

The installation kit and method of the present invention provide a substantial contribution in the field of adjustable absorption devices, in that an OEM for the first time can selectively adjust the damping setting of a "generic" absorption device, lock the setting, and then render the device tamper-proof with respect to the end user.

While the present invention has been described with reference to a particular preferred embodiment, it will be understood by those skilled in the art that various modifications and the like could be made thereto without departing from the spirit and scope of the invention as defined in the following claims.

What is claimed is:

1. An installation kit for installing an absorption device on a piece of equipment and then rendering the device tamper-proof with respect to the damping setting thereof, comprising:

an absorption device including adjustment means for adjusting the damping setting thereof, and locking means for locking said adjustment means after the damping setting has been set to a desired level;

obstruction means to be applied to said locking means for prohibiting access to said locking means, said obstruction means comprising a mass of deformable material; and a sheet material for carrying said obstruction means and for facilitating alignment of said obstruction means with said locking means during transfer of said obstruction means into said locking means.

2. The installation kit according to claim 1, wherein said absorption device includes inner and outer cylindrical pieces arranged coaxially one inside the other, said locking means includes a threaded stud extending through a threaded hole formed through the outer cylindrical piece, and said mass of deformable material is positioned to block access to the threaded stud.

3. The installation kit according to claim 2, wherein the threaded stud is a socket head set screw and said mass of deformable material is sized to be compressed into the tool-receiving opening of the socket head set screw.

4. The installation kit according to claim 3, wherein said mass of deformable material is substantially spherical.

5. The installation kit according to claim 2, wherein the threaded stud includes a tool-receiving opening formed in the exposed end thereof and said mass of deformable material is sized to be compressed into the tool-receiving opening.

6. The installation kit according to claim 2, wherein said sheet material includes adhesive tape, the adhesiveness of which facilitates alignment of said obstruction means with said locking means during application of said obstruction means onto said locking means.

7. The installation kit according to claim 1, wherein said absorption device includes a rotatable adjustment knob mounted to a fixed base, said locking means including a threaded stud extending through a threaded hole in said adjustment knob into said base, wherein said deformable mass is positioned to block access to the threaded stud.

8. The installation kit according to claim 4, wherein the threaded stud includes a tool-receiving opening formed in the exposed end thereof and said mass of deformable material is sized to be compressed into the tool-receiving opening.

9. The installation kit according to claim 4, wherein the threaded stud is a socket head set screw and said mass of deformable material is sized to be compressed into the hex opening of the socket head set screw.

10. The installation kit according to claim 4, wherein said sheet material includes adhesive tape, the adhesiveness of which facilitates alignment of said obstruction means with said locking means during application of said obstruction means onto said locking means.

11. A method of adjusting the damping setting of an absorption device and then rendering the device tamper-proof with respect to the damping setting thereof, the absorption device including adjustment means for adjusting the damping setting thereof, and locking means for locking the adjustment means after the damping setting has been set to a desired level, said method comprising the steps of:

manipulating the adjustment means to set the damping setting of the absorption device to a desired setting;

removably attaching a sheet material, having a mass of deformable material removably attached thereto, to the absorption device such that the mass of deformable material is in substantial alignment with the locking means; and transferring the mass of deformable material from the sheet material into compressed engagement with the locking means to thereby prohibit access to the locking means, thereby rendering the damping setting of the absorption device tamper-proof.

12. The method according to claim 11, wherein the threaded stud includes a tool-receiving opening formed in the exposed end thereof, the transferring step including the step of compressing the mass of deformable material into the tool-receiving opening.

13. The method of claim 12, wherein the locking means includes a socket head set screw and the mass of deformable material is substantially spherical and dimensioned to be larger in diameter than the diameter of the tool-receiving opening in the socket head set screw.

14. The method of claim 13, wherein the transferring step includes the step of compressing the mass of deformable material into the tool-receiving hole in the socket head set screw using an impact device.

15. The method of claim 14, wherein the transferring step includes impacting the ball of compressible material with a hammer to prevent further access to the set screw.

16. A mechanism for rendering the damping setting of an adjustable energy absorption device tamper-proof, the adjustable energy absorption device including a rotatable first element disposed within an fixed second element and locking means for preventing relative movement between said first and second element, the mechanism comprising:

a sheet material; and obstruction means removably adhered to said sheet material, said obstruction means having a predetermined dimension that enables said obstruction means to be compressively retained in a tool-receiving recess formed in an exposed end of the locking means of the energy absorption device.

17. The mechanism of claim 16, wherein said sheet material is a section of adhesive tape.

18. The mechanism of claim 16, wherein said obstruction means is a substantially spherical, deformable plastic ball.

* * * * *